Figure 1:
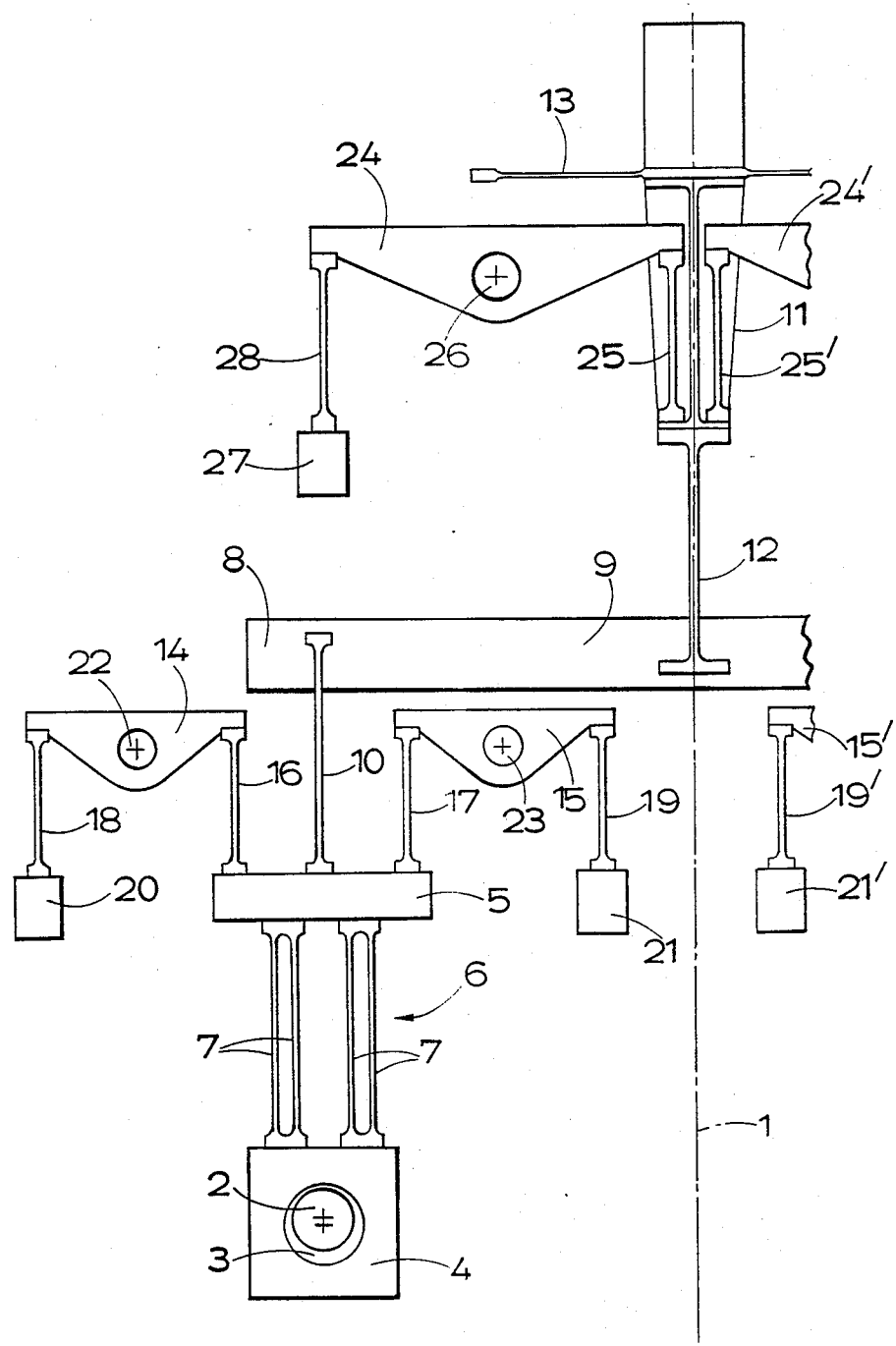

United States Patent [19]

Searle

[11] Patent Number: 4,905,883
[45] Date of Patent: Mar. 6, 1990

[54] FRICTION WELDING APPARATUS

[75] Inventor: John G. Searle, Hendesford, England

[73] Assignee: Allwood, Searle & Timney (Holdings) Limited, United Kingdom

[21] Appl. No.: 340,723

[22] PCT Filed: Dec. 7, 1987

[86] PCT No.: PCT/GB87/00887
§ 371 Date: Mar. 22, 1989
§ 102(e) Date: Mar. 22, 1989

[87] PCT Pub. No.: WO88/04213
PCT Pub. Date: Jun. 16, 1988

[30] Foreign Application Priority Data

Dec. 9, 1986 [GB] United Kingdom ............... 8629390
Mar. 19, 1987 [GB] United Kingdom ............... 8706581

[51] Int. Cl.$^4$ ........................................... B23K 20/12
[52] U.S. Cl. ........................................................ 228/2
[58] Field of Search ............................................. 228/2

[56] References Cited

U.S. PATENT DOCUMENTS 3,542,275 11/1970 Loyd et al. ..................... 228/2 N
3,777,967 12/1973 Searle et al. .................... 228/2 N

FOREIGN PATENT DOCUMENTS 290134 11/1988 European Pat. Off. ............ 228/2 N
1293531 10/1972 United Kingdom ............... 228/2 N Primary Examiner—Kenneth J. Ramsey
Attorney, Agent, or Firm—Leydig, Voit & Mayer

[57] ABSTRACT

In one method of friction welding two workpieces together, one workpiece is reciprocated while the other is pressed against it. When sufficient frictional heat has been generated, relative movement is caused to cease and the workpieces became welded. The invention provides apparatus comprising mechanism for effecting reciprocation of a ram (11) and for reducing its stroke rapidly to zero. The mechanism comprises rotatable eccentrics (3, 3') with followers (4, 4') connected by flexible blades (7, 7') to reciprocable elements (5, 5'). Those elements are in turn coupled by flexible blades (10, 10') to opposite ends (8, 8') of a rockable linking body ( 9, 101). A central part of the body is connected by a flexible blade (12) to the ram. The eccentrics rotate at the same speed. When in phase they reciprocate the linking body and ram, but when out of phase the linking body rocks and the ram remains stationary. Adjustment means (41) enables the phase of the eccentrics to be rapidly altered while they rotate.

12 Claims, 7 Drawing Sheets

FRICTION WELDING APPARATUS

This invention relates to friction welding apparatus.

In one method of generating heat for friction welding two workpieces together, a first one of the workpieces is caused to reciprocate while in contact with the other, or second, of the workpieces, the first and second workpieces being pressed together so that frictional heat is generated between them.

When sufficient heat has been generated to enable welding to be effected, relative reciprocatory movement between the workpieces is caused to cease and the workpieces are pressed together so that they become welded together. It is usual for the second workpiece to remain stationary, or substantially stationary, during the generation of frictional heat. In the description of the present invention that follows, it will be assumed that the second workpiece does indeed remain stationary, or substantially so; nevertheless it is to be understood that in making use of the invention the second workpiece may also be caused to reciprocate, or may be caused to move in some other manner, relative to the first workpiece during the generation of frictional heat.

Difficulties can arise in designing mechanism for causing reciprocation of the first workpiece. The difficulties can be particularly severe when the workpieces to be welded together are made of metal and have to be raised to a relatively high temperature before welding can be effected. Difficulties may arise, for example, from the fact that the first workpiece must be caused to reciprocate rapidly, typical rates of reciprocation being between 1000 and 6000 reciprocations per minute; each reciprocation is considered to be a complete cycle of movement, so that if, for example, the reciprocation is of simple harmonic form, each reciprocation is a full 360° movement. Difficulties may also arise from the fact that the frictional resistance forces that must be overcome are not only relatively high, being typically between 50 and 100 tonnes, but also vary during the frictional generation of heat, and from the fact that the relative movement between the workpieces must be stopped rapidly when the required temperature has been reached and usually the workpieces must then be located in predetermined relative positions before they are welded together.

One aim of the present invention is to enable at least some of those difficulties to be reduced or overcome.

From a first aspect the present invention consists in apparatus for use in friction welding comprising mechanism comprising driven means operative in use to cause reciprocation of a first workpiece relative to a second workpiece such as will lead to the generation of frictional heat between the workpiece, a first drive operative to generate reciprocatory motion and a second drive operative to generate reciprocatory motion of the same frequency as that of the first drive, adjustment means operative to enable the relative phase of the first and second drives to be adjusted while said drives are in use, and integrating means operative to produce reciprocatory motion of said driven means which is a function of the reciprocatory motions of the first and second drives and of which the amplitude can be reduced to zero by appropriate adjustment of the adjustment means, the integrating means comprising a rockable linking body, the first drive being coupled by first coupling means to a first part of the linking body, and the second drive being coupled by second coupling means to a second part of the linking body, spaced from said first part, and said driven means being coupled to a third part of the linking body, spaced from said first and second parts thereof.

The reciprocatory movement of each of the drives is preferably simple harmonic movement so that reciprocatory movement of the driven means is also of simple harmonic form or approximately of simple harmonic form, being the sum of simple harmonic reciprocations of the same frequency.

In carrying out friction welding it is usually desirable, and indeed often essential, for the first and second workpieces to be brought into predetermined relative positions after they have been heated but before they are welded together. This is made possible when using apparatus in accordance with the present invention as operation of the adjustment means can be such as to enable the amplitude of reciprocatory movement of the driven means to be rapidly but progressively reduced to zero at an appropriate stage in the welding process.

A particular advantage of using apparatus in accordance with the first aspect of the present invention is that it avoids the need to employ eccentrics with variable throw; this is important as there are problems associated with the use of eccentrics with variable throw, and in particular there are problems involved in balancing such eccentrics.

Said third part of the linking body, to which the driven means is coupled, is preferably between said first part and said second part. Moreover, the amplitude of the reciprocatory motions of the first and second drives are preferably equal, and the third part of the linking body is preferably disposed half way between the first and second parts. When that arrangement is adopted, the apparatus is such that in use when the first and second drives are fully out of phase with each other the first and second parts of the linking body move in opposite directions, while the third part of the linking body remains in the same place and therefore does not move the driven means. When the first and second drives are in phase or are only partially out of phase with each other, however, the third part of the linking body performs reciprocatory motion and therefore causes the driven means to perform reciprocatory motion. The closer that the first and second drives are to being fully out of phase with each other, the smaller is the amplitude of reciprocation of the driven member. At the same time, however, the maximum force that can be exerted by the driven member increases as the amplitude of its reciprocation is reduced.

Preferably the first coupling means is flexible and is anchored at one end to the first part of the linking body, and the second coupling means is flexible and is anchored at one end to the second part of the linking body, relative movement that occurs in use between the linking body and the coupling means being accommodated by flexure of the coupling means.

The use of flexible coupling means obviates the need to provide any pivotal connections between either of the drives and the linking body. This can simplify the design of the apparatus quite considerably as it will be appreciated that if, for example, rigid coupling means were used to couple each of the drives to the linking body, each coupling means being pivotally connected at one end to the linking body, each of the pivotal connections would, in use, be subjected to forces that would be relatively large and rapidly changing in direction, while subjected to rotational movement to and fro, through only relatively small angles. Such pivotal connections would doubtless require relatively large bearing surfaces and would be difficult to lubricate satisfactorily. In some circumstances, nevertheless, those difficulties may not be insuperable, but its generally preferred to use flexible coupling means.

Each flexible coupling means preferably comprises a rectilinear blade, which is preferably of uniform rectangular cross-section over at least most of its length. End portions of the flexible coupling means may be of progressively increasing thickness and thus of progressively increasing stiffness.

It is to be understood that throughout this specification, including the claims, the term anchored, when used to described the attachment of a flexible component of the apparatus to some other component of the apparatus, is intended to denote a form of attachment such as to permit no relative movement between the components at the point of attachment; moreover the term anchored is used to include constructions in which a flexible component is formed integrally with another component.

Each of the first and second drives preferably comprises a rotatable input member, a reciprocable output element, to which the associated part of the linking body is coupled by the associated coupling means, and conversion means operative to convert rotational movement of the input member into reciprocatory movement of the output element. It may be possible for each conversion means to comprise an eccentric rotatable by the associated input member, and for the output element merely to comprise a follower drive in an orbital path by the eccentric. The orbital movement of the follower could then be considered as a combination of two reciprocatory movements at right angles to each other, one of those reciprocatory movements serving to move the associated part of the linking body. The coupling means operative between the follower and the linking body would, if rigid, have to be capable of universal pivotal movement at each end or, if flexible, would have to be capable of flexure in any direction. It is thought that such an arrangement would not normally be appropriate, particularly when the resistance to relative movement between the workpieces is relatively high.

Therefore, each of the first and second conversion means preferably comprises an eccentric rotatable by the associated input member, a reciprocable follower driven in an orbital path by the eccentric and connecting means operative between the follower and the associated output element, the adjustment means being operative to vary the relative phase between the eccentrics.

Each connecting means may comprise side means permitting relative movement between the follower and its associated output element in one direction but preventing relative movement between the follower and its associated output element in a direction transverse to said one direction. The conversion means would then resemble a Scotch crank. In one specific construction, the eccentric comprises a pin which extends through a block that constitutes the follower. The block is slidable lengthwise of a slot formed in an output element that is constrained to move only in a direction at right angles to the slot. In use, as the block performs its orbital movement it causes the output element to reciprocate.

While such an arrangement may be satisfactory, problems may arise with lubrication. In a preferred arrangement, therefore, each connecting means is flexible and is anchored at one end to the associated follower and at the other end to the associated output element, relative movement between the follower and the output element being accommodated by flexure of the connecting means.

In any construction employing eccentrics, there is preferably brake means operative to exert a torque resistant to relative rotation of the eccentrics during adjustment.

In constructions in which there are first and second flexible connecting means anchored respectively to first and second output elements, and there are first and second flexible coupling means each anchored at one end to the associated output element, then it is preferred to arrange for the associated connecting means and coupling means to be capable of flexure only in directions at right angles to each other. This arrangement leads to increased stability. Each coupling means and its associated connecting means preferably project in the same direction from the associated reciprocable output element. This arrangement generally enables the apparatus to be more compact than would otherwise be the case.

In any form of the apparatus in which there are rotatable input members, the adjustment means preferably comprises a first helical gear coupled to the first rotatable input member and a second helical gear coupled to the second rotatable input member, the helical gears being co-axial and of opposite hands, and coupling means engaging the gears and movable axially, while rotating, to alter the relative angular relationship between the helical gears and consequently the relative angular relationship between the input members.

The driven means is preferably coupled to the linking body by main flexing means anchored at one end to the driven means and at the other end to the linking body, relative angular movement that occurs in use between the driven means and the linking body, when the first and second drives are not in phase, being accommodated by flexure of the main flexing means. The linking body preferably comprises a pair of parallel spaced plates between which extends the main flexing means. This arrangement again enables a particularly compact construction to be achieved and also enables the rocking axis of the linking body to be substantially co-axial with the axis of flexure of the main flexing means. In those forms of the apparatus in which the coupling means are flexible and in which there is main flexing means, those coupling and flexing means preferably comprise flexible blades that are mutually parallel, are of the same length and extend in the same direction from the linking body, the arrangement being such that in use, when the linking body rocks, those blades flex in unison and in the same manner, so that the resultant position of the driven means relative to the first and second drives is independent of the changes in effective length of the blades when they flex.

The driven means is preferably connected to a central part of a flexible diaphragm which constrains it to reciprocate along a rectilinear path.

Each reciprocatory component of the apparatus is preferably balanced by a counterweight which is constrained by rocking means to move in a direction opposite to that in which that component is moving.

The apparatus also preferably includes mounting means mounting means for said second workpiece and pressure means operative to press said second workpiece against the reciprocating first workpiece. Preferably said mechanism is mounted on a fixed support and the pressure means is mounted independently on said fixed support.

Figure 2:
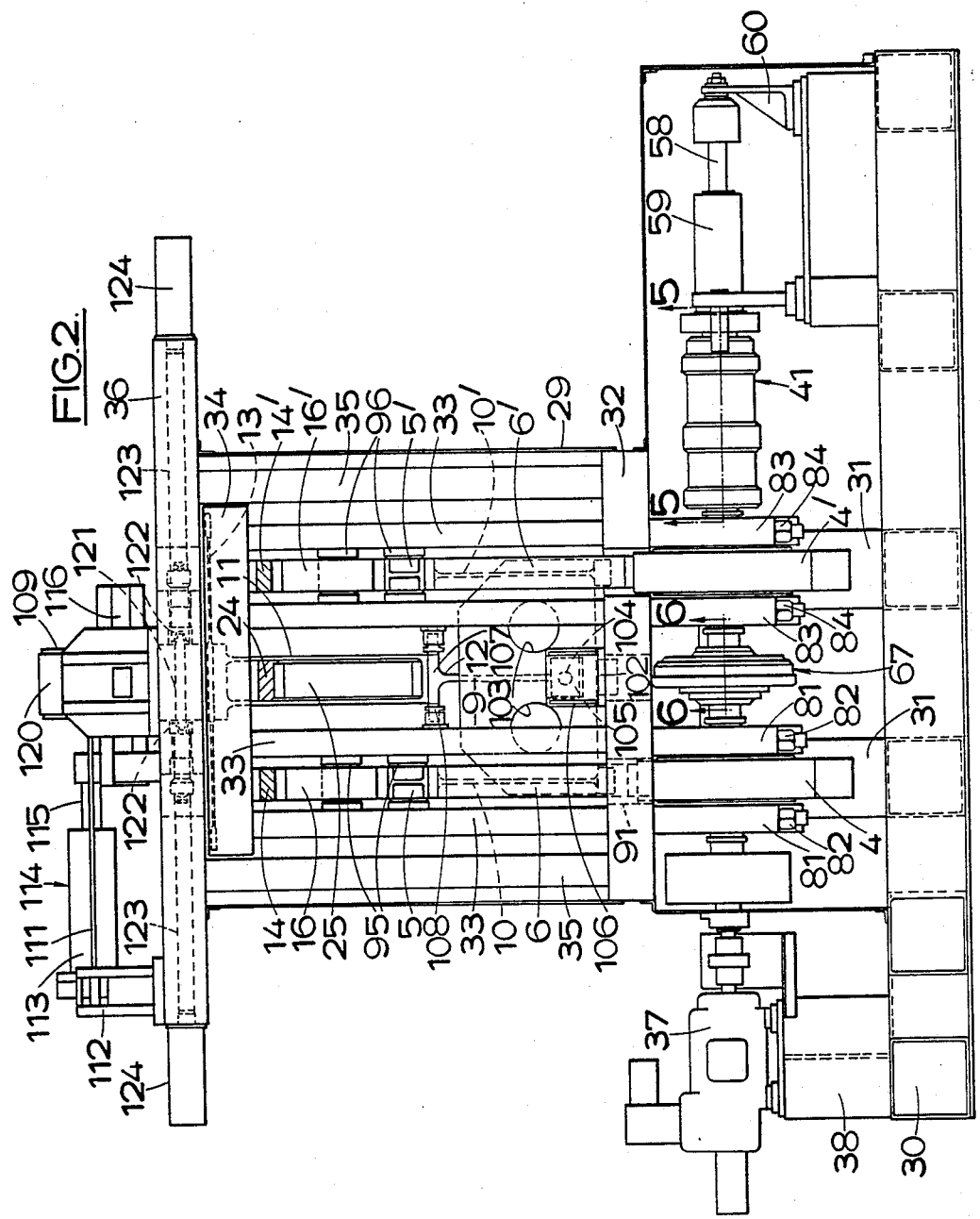
Figure 3:
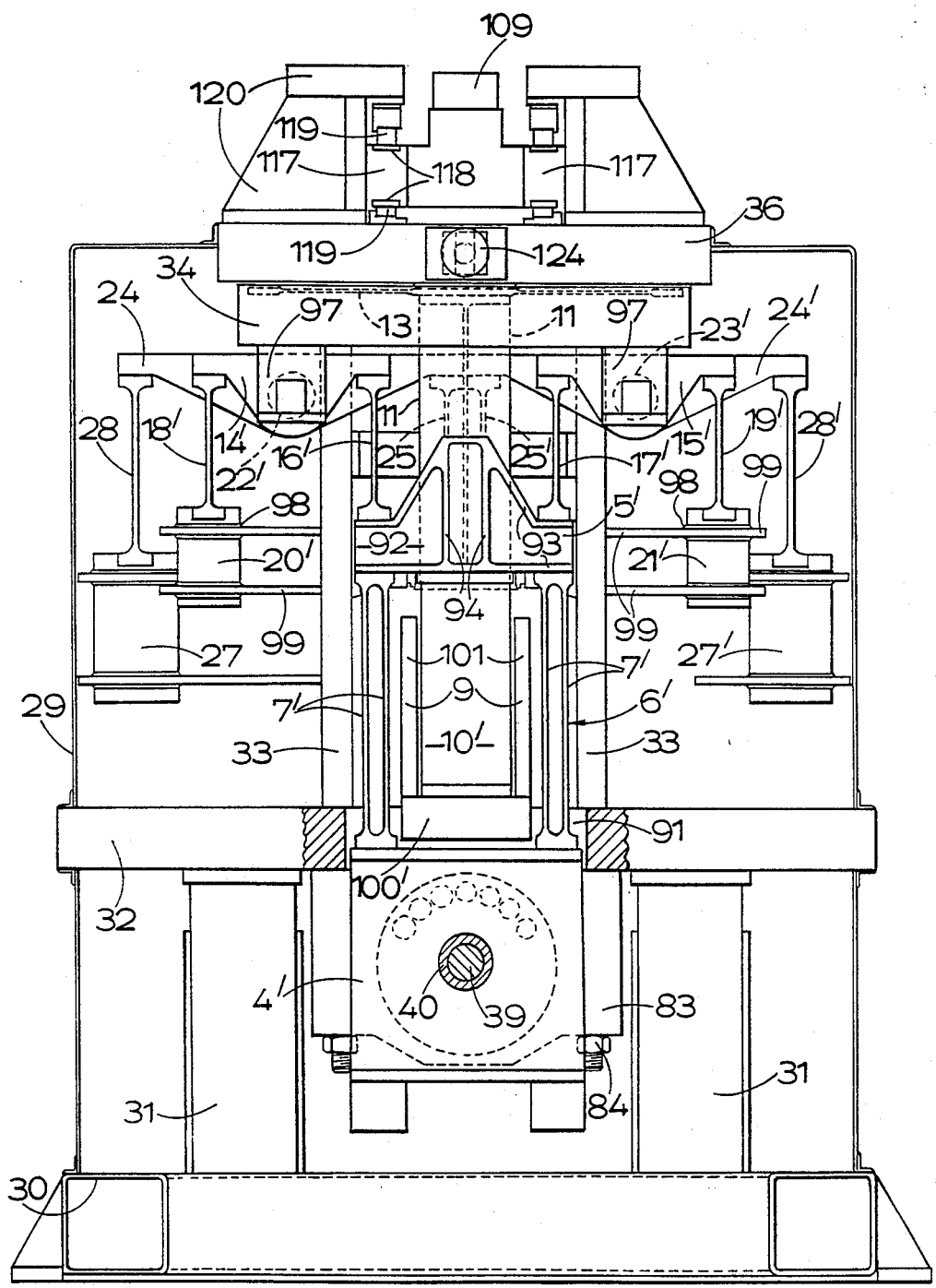
Figure 4:
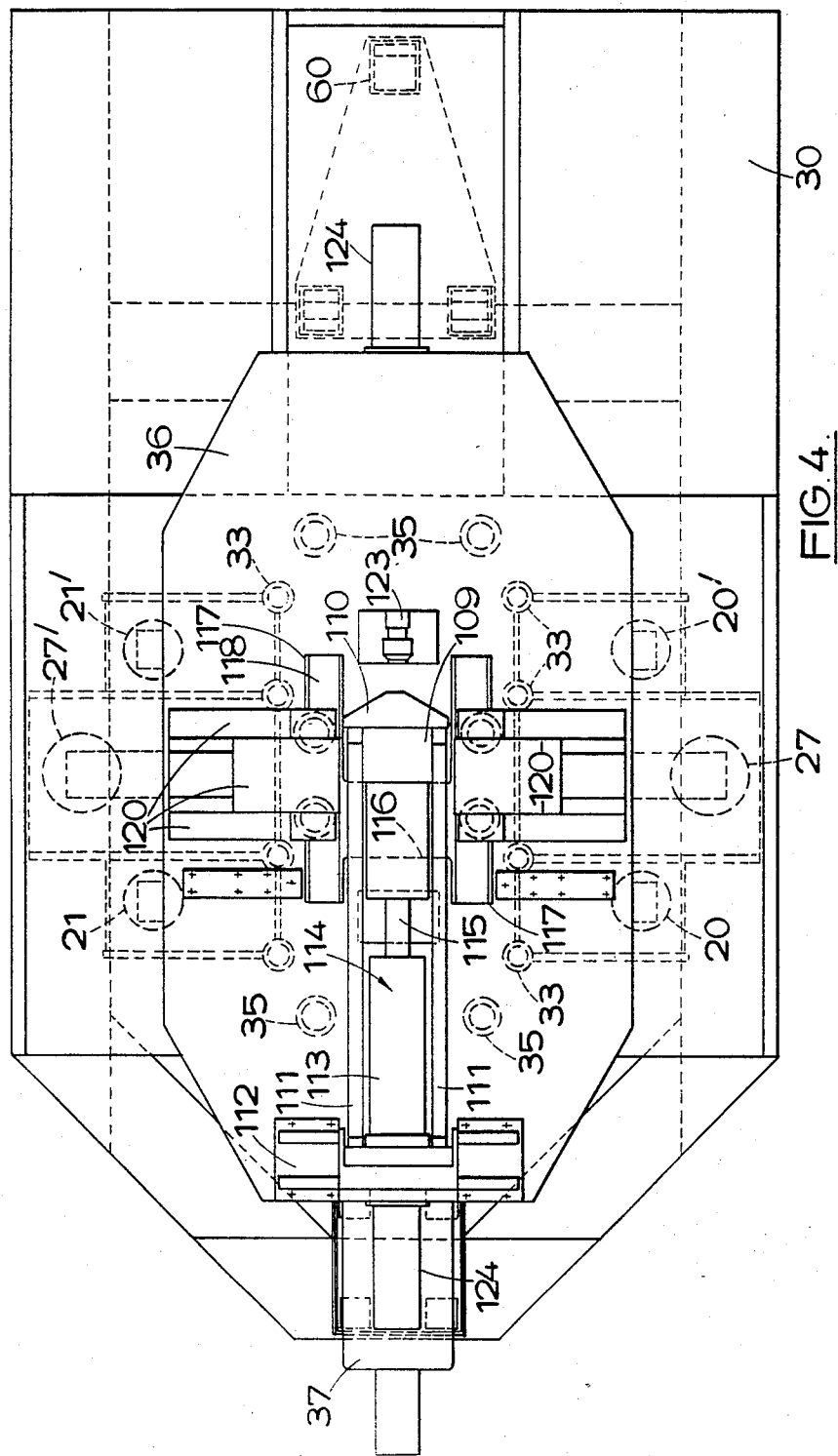
Figure 5:
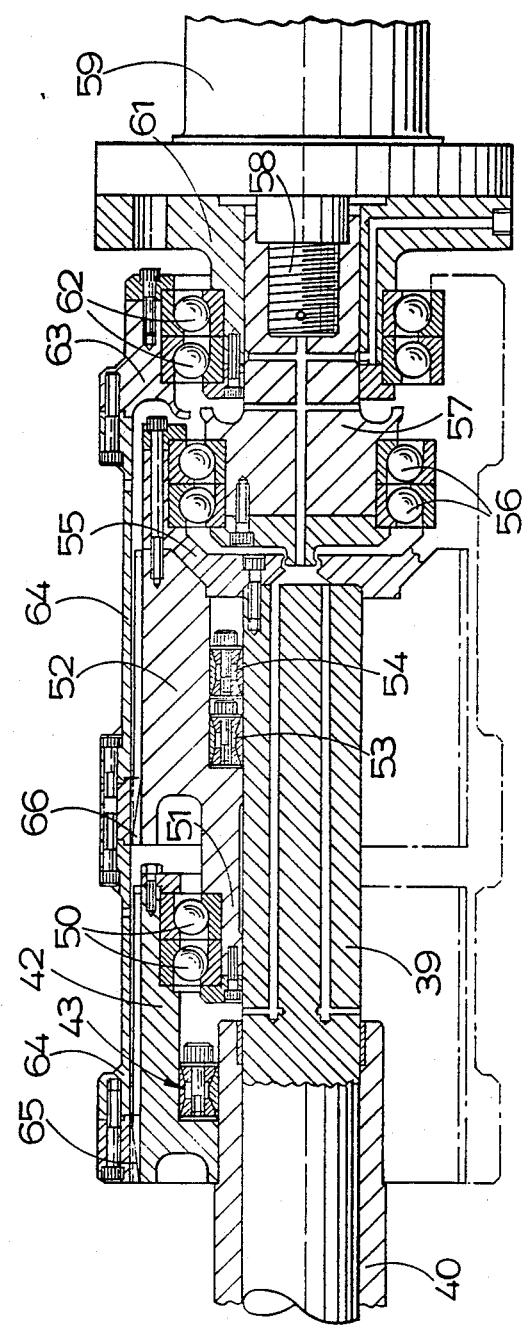
Figure 6:
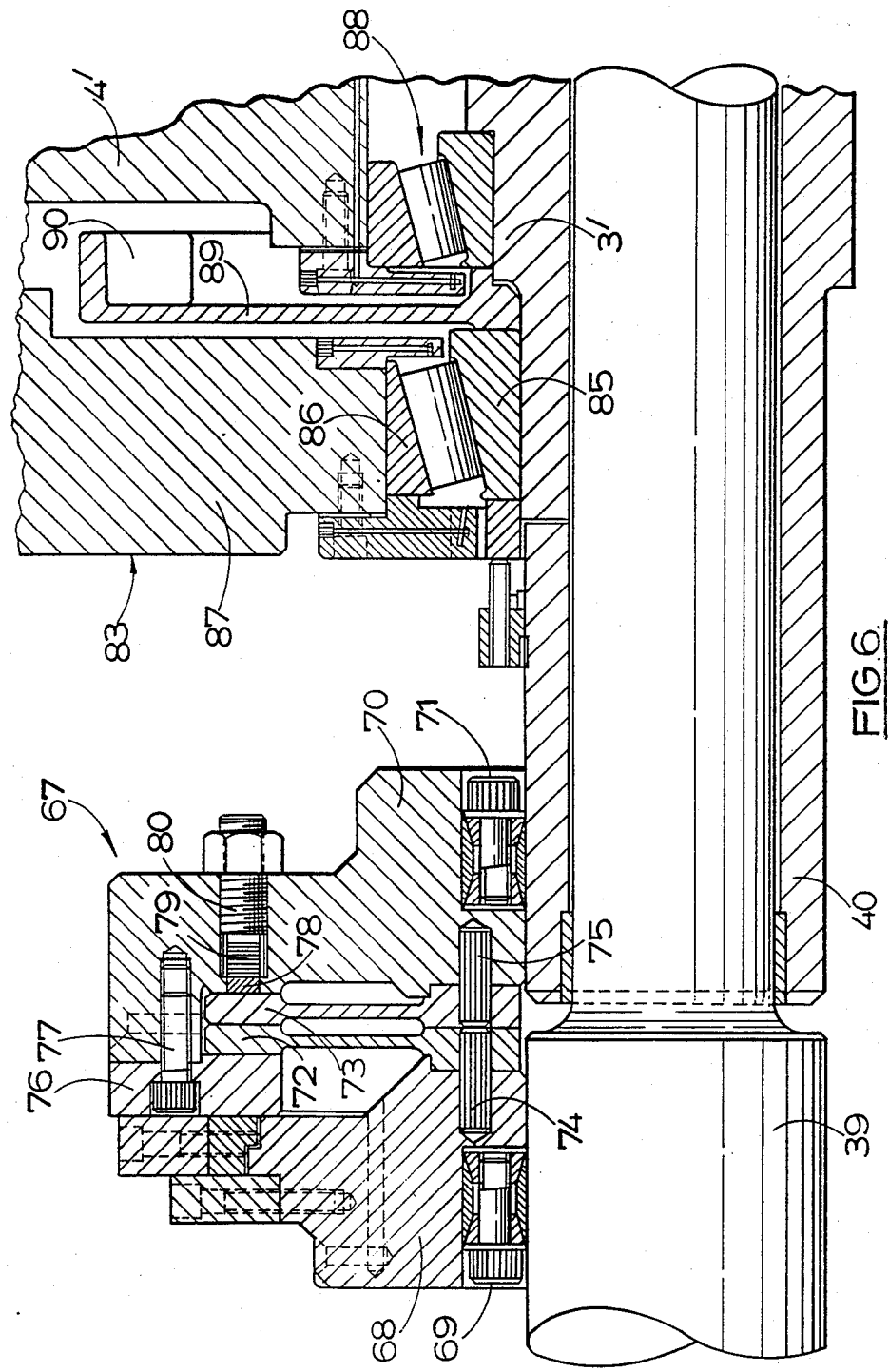
Figure 7:
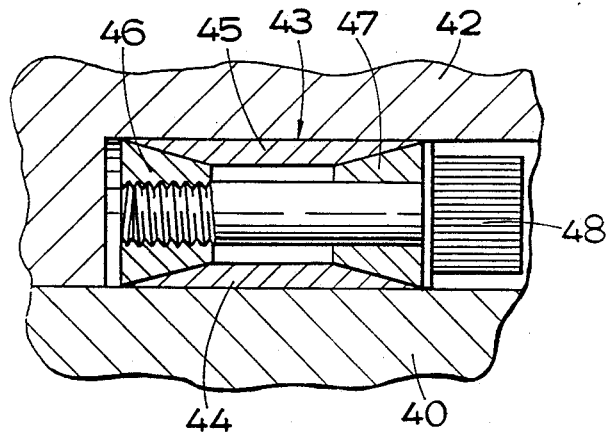
Figure 8:
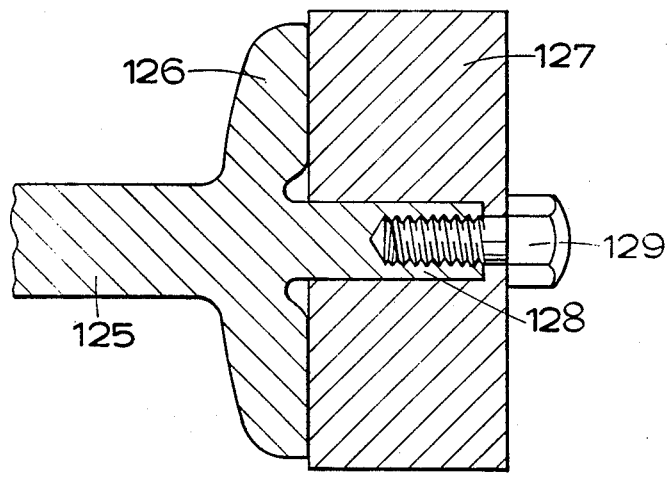

One embodiment of the present invention will now be described in more detail, by way of example, with reference to the accompanying drawings, in which:

FIG. 1 is a schematic view illustrating the principles of apparatus for use in friction welding and embodying the present invention, FIG. 2 is a side elevation of apparatus for use in friction welding and embodying the principles illustrated schematically in FIG. 1, certain parts being omitted for clarity, FIG. 3 is an end elevation of the apparatus, to a larger scale, as viewed from the right of FIG. 2, FIG. 4 is a plan view, to a larger scale, of the apparatus shown in FIG. 2, FIG. 5 is a section, to a larger scale, along the line 5—5 of FIG. 2, FIG. 6 is a section, to a larger scale, along the line 6—6 of FIG. 2, FIG. 7 is a scrap view to a further enlarged scale, of a detail of FIG. 6, and FIG. 8 is a section through an end part of a flexible blade, illustrating its anchorage to another part of the apparatus.

FIG. 1 is a schematic view illustrating apparatus for use in friction welding and embodying the present invention. Only part of the apparatus is shown, but the part that is omitted, to the right of the Figure, is similar to the part shown, the apparatus being symmetrical about the centre-line 1. For clarity of description, components shown to the left of the centre-line 1 will be designated by reference numerals, while those to the right of the centre-line will be designated by the same reference numerals to each of which is added a prime (').

The apparatus includes a rigid, stationary frame, not shown in FIG. 1. The apparatus also includes a rotatable drive member 2 which constitutes an input member. An eccentric 3 on the drive member 2 carries a follower 4. A reciprocable output element 5 is coupled to the follower 4 by flexible connecting means 6. The element 5 is mounted in guides (not shown in FIG. 1) so that it is constrained to move to and fro along a rectilinear path. The flexible connecting means 6 comprises two pairs of flexible metal blades 7. The components 2 to 7 together constitute a first drive, of which the components 3, 4 and 6 constitute conversion means, operative to connect rotary movement of the drive member 2 into reciprocatory movement of the element 5. A central part of the element 5 is coupled to one end part 8 of integrating means, illustrated schematically here in the form of a simple rigid beam 9, which constitutes a linking body, by means of a flexible blade 10 constituting flexible coupling means. A central part of the beam 9 is coupled to one end portion of a rigid reciprocable ram 11 by means of a flexible main blade 12 constituting main flexing means, anchored to the ram and the beam. The ram 11 is so mounted that it can reciprocate in a longitudinal direction but cannot move in any other direction. To this end a central part of the ram 11 is connected to the central part of a flexible diaphragm 13, of which the outer edges are anchored to the stationary frame of the apparatus.

Balancing means is provided for the reciprocating components of the apparatus. Illustrated in FIG. 1 are balancing means for the reciprocable output element 5, the beam 9 and the ram 11. End portions of the reciprocable element 5 are coupled to end portions of a pair of rockers 14 and 15 by means of flexible blades 16 and 17 respectively anchored to the element and rockers. Flexible blades 18 and 19 anchored respectively to the other end portions of the rockers 14 and 15 are also anchored to respective cylindrical counterweights 20 and 21 which are mounted in guides (not shown in FIG. 1) which constrain them to move only along rectilinear paths parallel with their longitudinal axes. The rockers 14 and 15 are mounted at their centres on pivot pins 22 and 23 respectively which are mounted in blocks (not shown in FIG. 1) fixed to the frame of the apparatus. That end portion of the ram 11 to which the main blade 12 is connected is also coupled to end portions of a pair of rockers 24 and 24' by means of flexible blades 25 and 25' anchored to the ram and the rockers. The rocker 24 is mounted at its centre on a pivot pin 26 mounted in a block fixed to the frame of the apparatus, and the other end portion of the rocker is coupled to a cylindrical counterweight 27 by means of a flexible blade 28 anchored to the rocker and the counterweight. Like the counterweights 20 and 21, the counterweight 27 is constrained to move along a rectilinear path parallel with its longitudinal axis.

The drive members 2 and 2' can be rotated by a common motor (not shown in FIG. 1). Adjustment means (also not shown in FIG. 1) is provided to enable the relative phase of the drive members, and consequently of the eccentrics 3 and 3' to be adjusted.

In use the drive members 2 and 2' are rotated at the same speed. The eccentric 3 causes the follower 4 to perform orbital motion, that is to follow a circular path but without bodily rotation. That orbital motion causes reciprocatory motion of the output element 5, relative lateral movement between the follower 4 and the element 5 being accommodated by flexure of the blades 7 of the flexible connecting means 6. The reciprocatory motion of the element 5 is transmitted to the end part 8 of the beam 9 through the intermediary of the coupling blade 10. When the eccentrics 3 and 3' are exactly in phase with each other, the blades 10 and 10' reciprocate in unison, thus causing the beam 9 to reciprocate bodily without any rocking movement. When the eccentrics 3 and 3' are exactly 180° out of phase with each other, however, the blades 10 and 10' reciprocate out of phase with each other with the result that the beam 9 rocks back and forth about its centre centre without moving bodily. The resultant slight angular movement of the end parts 8 and 8' of the beam 9 relative to the output elements 5 and 5' is accommodated by flexure of the blades 10 and 10'. When the eccentrics 3 and 3' are in any other out-of-phase relationship, the resultant movement of the beam combines both bodily movement and rocking movement. If the adjustment means is operated to cause the eccentrics to shift from a state in which they rotate in unison to a state in which they are 180° out of phase with each other, the amplitude of bodily movement of the central part of the beam is progressively reduced from a maximum value to zero. Moreover, the final position of the central part of the beam is half way between the end points of its travel when it was reciprocating bodily to and fro. Bodily movement of the central part of the beam 9 is transmitted to the ram 11 by the main blade 12, any rocking movement of the beam being accommodated by flexure of the main blade.

Reciprocating movement of the connecting means 6, element 5 and end part 8 of the beam 9 is balanced by reciprocatory movement of the counterweights 20 and 21, the counterweights always moving in the opposite direction from the connecting means, element and end part. This is brought about by rocking movement of the rockers 14 and 15 about their pivot pins 22 and 23. Relative angular movements that occur between the rockers and the element 5 and the counterweights 20 and 21 are accommodated by flexure of the blades 16, 17, 18 and 19. Reciprocatory movement of the remaining, central part of the beam 9 and of the ram 11 is similarly balanced by the movement of the counterweights 27 and 27'. As the rockers 24 and 24' rock about their pivot pins 26 and 26', relative angular movement between the rockers and the ram and the counterweights 27 and 27' are accommodated by flexure of the blades 25 and 27. The effect of the balancing means in use is to ensure that the frame as a whole experiences little or no resultant reciprocatory force tending to rock it to and fro. The angular rocking movement of the beam 9 is not balanced, it is only the translational, reciprocatory component of movement of the beam that is balanced. For this purpose the beam is treated as if it were in three independant parts: two end parts 8 and 8' and the remaining central part. As explained above, the end parts are balanced by the counterweights 20, 21, 20' and 21' while the central part is counterbalanced by the counterweights 27 and 27'. This compromise solution to the problem of balancing the beam avoids the need for independant counterweights for the beam and is found to be entirely adequate.

The apparatus illustrated in FIG. 1 is intended to be used in the following manner. A first one of two workpieces to be welded together (not shown) is secured to that end of the ram 11 further from the main blade 12, while the second of those workpieces is pressed laterally against it and is restrained from reciprocating with the first workpiece. The motor is operated to rotate the drive members 2 and 2' and the adjustment means is adjusted so that the first workpiece is caused to reciprocate. When sufficient frictional heat has been generated between the workpieces to enable the workpieces to be welded together, the adjustment means is adjusted to bring the eccentrics 3 and 3' out of phase so that the first workpiece ceases to reciprocate. The workpieces continue to be pressed together and become welded to each other.

It is to be understood that the mass of the first workpiece can be balanced by suitable selection or adjustment of the mass of counterweights 27 and 27'.

It will also be appreciated that while welding is being effected there is no need for the drive members 2 and 2' to cease rotation.

A practical embodiment of apparatus in accordance with the present invention is illustrated in FIGS. 2 to 7. As will become apparent, the lay-out of the apparatus is different from that illustrated schematically in FIG. 1, but in all major respects the components of the practical embodiment are the same as those in the schematic apparatus, they are interconnected in the same manner and operate in the same manner. The apparatus is relatively complex in construction, and a few minor simplifications have been made in the drawings in order to illustrate the invention clearly. For example, a casing 29 for much of the apparatus is partially omitted from some views.

The apparatus will be described as being in an orientation in which it is primarily intended to be used. Nevertheless, as explained in more detail below, the apparatus may be used in a different orientation.

The apparatus is intended for use in welding together metal workpieces. It is intended that in use the force exerted by the ram should not exceed 15 tonnes, and that the ram should perform about 4500 reciprocations per minute, with a maximum stroke of 6 mm.

The apparatus comprises a rigid, fabricated metal base 30. Pillars 31 on the base support a thick metal base plate 32 which extends horizontally. Eight tubular metal pillars 33 on the base plate 32 support a thick metal top plate 34, parallel with the base plate 32. The pillars 33 are welded to the base plate and the top plate 34, but to avoid the weld being subjected to tension in use, axially extending tie bolts, in tension, act between the pillars and the plates so that the welds are always in compression. In use the rigid framework thus formed houses components of less than one tonne in total mass, but in use may be subjected to reciprocating forces of approaching 70 tonnes. An additional eight tubular metal pillars 35 on the base plate 32 support a thick metal welder plate 36 which is spaced a short distance above the top plate 34. As there is no direct connection between the top plate and the welder plate, reciprocating forces to which the top plate are subjected in use are not transmitted to the welder plate.

An electric motor 37 is mounted on a stand 38 on the base 30. This drives a main shaft 39 which constitutes the drive member 2 (or first rotatable input member) referred to above. A sleeve 40, constituting the drive member 2' (or second rotatable input member), is rotatably mounted on a part of the shaft 39 spaced from the motor. The angular relationship between the shaft 39 and the sleeve 40 is controlled by adjustment means 41. This is shown in section in FIG. 5.

A helically splined gear 42 is secured to the end of the sleeve 40 by means of an attachment device 43 housed in an annular groove, the inner wall of which is defined by the sleeve and the outer wall of which is defined by the gear. The attachment device 43 is shown to a larger scale in FIG. 7. A ring 44 of tapered cross-section engages the inner wall of the groove and a ring 45 of similar cross-section engages the outer wall. Wedging rings 46 and 47 engage the inclined faces of the rings 44 and 45. Screws are disposed at uniform intervals around the rings. The shank of each screw, such as the screw 48, passes through a hole in the wedging ring 47 and engages a threaded hole in the ring 46. When the screws are tightened, the rings 44 and 45 are resiliently deformed and are brought into tight abutment with the sleeve 40 and gear 42 respectively, thereby securing them together. In use, when varying loads are applied to the sleeve and the gear, the loading on the components of the attachment device varies but does not normally fall to zero, with the result that there is no tendency for the device to become loose or to be damaged.

Thrust bearings 50 act between the gear 42 and an integral, axial extension 51 of a second helically splined gear 52. Attachment devices 53 and 54, similar to the device 43, secure the gear 52 to the main shaft 39. A cup-shaped extension 55 secured to the gear 52 houses thrust bearings 56 that act between the extension and a composite projection 57 which is secured to one end of a piston rod 58 constituting part of an hydraulic piston-and-cylinder unit. As can be seen in FIG. 2, the piston rod 58 extends through an hydraulic cylinder 59 of the unit and is secured to a bracket 60 attached to the base 30 of the apparatus. When the hydraulic unit is operated, the cylinder 59 moves axially on the piston rod 58. An extension 61 attached to the cylinder 59 carries thrust bearings 62 which act between the extension and an annular member 63 attached to one end of a composite sleeve 64 which extends axially past both the gear 52 and the gear 42. Rings 65 and 66 with internal helical teeth are fixed inside the sleeve 64 and engage the splines of the gears 42 and 52 respectively. The splines on those gears are of opposite hands.

In use, when the adjustment means is in the state illustrated, rotation of the main shaft 39 by the motor 37 causes rotation of the gear 52 which in turn causes rotation of the gear 42 and sleeve 40 through the intermediary of the sleeve 64 and internally-toothed rings 65 and 66. When the adjustment means is then operated to move the cylinder 59 to its opposite end position, the sleeve 64 is pulled to the right, as viewed in FIGS. 2 and 5. As the toothed rings 65 and 66 move along the splines of the gears 42 and 52, the gears rotate relative to each other in opposite direction, as do the sleeve 40 and main shaft 39 to which the gears are secured. The total relative rotation is 180°.

During the period the adjustment means is in operation, the main shaft 39 and sleeve 40 rotate a plurality of times. During that rotation, each of them is subjected to varying torques from the eccentrics. The reason for this is as follows. When the phase-difference between the eccentrics 3 and 3' is at any value between 0° and 180° the first workpiece is reciprocating and experiences considerable frictional resistance, which may, for example, be of the order of 15 tonnes. During part of each rotation of the main shaft 39 and sleeve 40, one of the followers 4 and 4' is rising while the other is moving downwards. The rate of upward movement of the rising follower is not normally the same as the downward movement of the other follower so that there is a resultant movement, either upwards or downwards, of the ram 11. Taking the case of the ram rising, this is a consequence of the rising follower moving more rapidly than the descending follower. When this occurs, the rising follower will exert a force on the beam 9 which will tend to urge the descending follower downwards, its descent in fact being controlled by its associated eccentric. Therefore the eccentric will at that time experience a torque tending to rotate it forwards instead of the torque that opposes rotation and that is more usually experienced.

The varying torque experienced by the eccentrics act in directions such as to urge the sleeve 40 to rotate relatively to the main shaft 39 alternately in one rotational sense and in the other. Reversal of the torque in that manner would tend to rattle the toothed rings 65 and 66 relative to the gears 42 and 52 and to cause damage. In order to prevent this phenomenon, brake means 67 is provided to operate continuously between the sleeve and the main shaft. The resistance afforded by the brake means during an adjustment period overrides the effect of the alternating torque applied by the eccentrics so that the resultant total torque, which is the sum of the torques applied by the followers and the torque applied by the brake means, is always applied in a single direction such as to resist relative rotation between the sleeve and the main shaft.

Details of the brake means 67 are shown in FIG. 6. An annular body 68 is secured to the main shaft 39 by an attachment device 69 similar to the device 43, and an annular body 70 is secured to the sleeve by a similar attachment device 71. Mutually abutting brake discs 72 and 73 are disposed between the bodies 68 and 70. A dowel 74 anchors the disc 72 against rotation relative to the body 68, and a dowel 75 anchors the disc 73 against rotation relative to the body 70. Outer parts of the discs lie between the body 70 and a backing ring 76 secured to the body 70 by screws 77. A bearing ring 78 in the body 70 engages the disc 73 and is urged towards it by groups of Belleville springs 79 bearing on it at intervals around it. The springs 79 abut associated screws 80 in the body 70.

As shown in FIG. 2, the main shaft 39 is rotatably mounted in a pair of axially spaced bearing assemblies 81 secured by screw-and-nut assemblies 82 to the base plate 32. The sleeve 40 is rotatably mounted in a pair of axially spaced bearing assemblies 83 secured by screw-and-nut assemblies 84 to the base plate 32. The four bearing assemblies are all of similar construction; part of one of the assemblies 83 is shown in FIG. 6, where inclined tapered rollers are shown as acting between a frusto-conical face of a ring 85 keyed to the sleeve 40 and a frusto-conical face of a ring 86 secured to a fixed component 87.

The main shaft 40 is formed with an eccentric portion between the bearing assemblies 83; this eccentric portion is the embodiment of the eccentric 3 described above with reference to FIG. 1. The main shaft 39 is formed with a similar eccentric portion 3' between the bearing assemblies. The axes of the eccentrics are spaced 3 mm from the common axis of the main shaft and sleeve. The arrangement is such that operation of the adjustment means 41 adjusts the eccentrics from a state in which they are in phase with each other to a state in which they are 180° out of phase. The eccentrics 3 and 3' rotate in followers 4 and 4'. As shown in FIG. 6, a bearing 88 with tapered rollers acts between the eccentric 3' and the follower 4'. A disc is keyed to the sleeve 40 on each side of the eccentric 3', one of those discs, 89, being shown in FIG. 6. Similar discs are keyed to the main shaft 39, one one each side of the eccentric 3. Each of the four discs carries a counterweight near its periphery, that on disc 89 being shown at 90. The arrangement is such that the centre of mass of each eccentric, with its associated pair of counterweights is located on the axis of rotation of the shaft 39 and sleeve 40.

Through holes 91 in the base plate 32 accommodate parts of the followers and the associated connecting means 6 and 6'. As can be seen in FIG. 3, each pair of metal blades 7' of the connecting means 6' is formed from a single piece of metal. Each end portion of each blade is of progressively increasing thickness and merges into an associated end block. The connecting means 6' are anchored to a reciprocable element 5' which is of the shape illustrated. The element 5' has a central web 92 in the shape of a rectangle from which two adjacent corner portions have been removed. Stiffening flanges 93 extend along upper and lower edges of the web, while a pair of parallel locating flanges 94 extend vertically between central parts of the flanges 93. Upper and lower bearing blocks 95 (omitted from FIG. 3 but shown in FIG. 2) project into the grooves between the locating flanges 94. The bearing blocks are mounted on cross-members 96 fixed to pillars 33 and constrain the element 5 so that it can reciprocate vertically but can move in no other manner. In FIG. 3 the rockers 14' and 15', blades 16', 17', 18' and 19', counterweights 20' and 21', and pivot pins 22' and 23' are clearly shown. The pivot pins 22' and 23' extend through blocks 97 secured to the top plate 34. The counterweights 20' and 21' extend through annular bearing rings 98, in fixed plates 99 secured to pillars 33, and can slide axially in those rings.

In FIG. 1, the blade 10 is shown as extending upwards from the element 5 away from the eccentric 3. In the practical embodiment, however, the blade 10 extends downwards. Likewise the blade 10' extends downwards from the element 5' towards the eccentric 3' and is disposed between the pairs of flexible blades 7. Moreover, in FIG. 1 the side blade 10, like all the flexible blades, is shown as being flexible laterally, i.e. in the plane of the Figure, whereas in the practical embodiment, as shown in FIGS. 2 and 3, the blade 10' is turned through 90° and is flexible in directions at right angles to the blades 7'. That end of the side blade 10' further from the element 5' is formed integrally with an enlarged block 100' which enters the adjacent hole 91 in the base plate 32.

The components driven by the eccentric 3 are similar to those described above as being driven by the eccentric 3' and will not be further described. As before, components driven by the eccentric 3' are given reference numerals to which primes are added.

The blocks 100 and 100' are connected to opposite end parts of the beam 9, which in the practical embodiment of the invention, is constituted by a pair of rigid, parallel plate 101. As shown in FIG. 2, each plate is in the shape of a rectangle with two adjacent corners removed. The main blade 12 extends between the plates 101 and is disposed half way between the coupling blades 10. At its lower end the main blade 12 is formed integrally with a block 102 (FIG. 2) end portions of which extend beneath the plates 101 and are anchored to the plates. In use, when the eccentrics 3 and 3' are out of phase with each other, the beam 9 rocks to and fro. As the coupling blades 10 and 10' and the main blade 12 are all of the same length and are disposed parallel to one another, the rocking movement of the beam results in the three blades all flexing in the same manner. As a consequence of that, the upper ends of the three blades remain in mutual alignment; for example, when the upper end of one side blade rises and that of the other falls through the same distance, the level of the upper end of the main blade 12 remains unaltered in spite of the fact that the lower end of the main blade may rise slightly as a consequence of the flexure of the blades.

When the beam 9 rocks as described above, and the main blade 12 flexes, the axis about which that rocking or tilting takes place extends horizontally through the main blade at a level a little above the lower end of the main blade. The exact location of the axis can best be determined by experiment. It is desirable that the axis about which the beam rocks should pass through the centre of mass of the beam, and to this end holes 103 are formed in the plates 101. Trunnions 104 co-axial with the axis of rocking or tilting project outwards from the plates 101 and are rotatable in blocks 105 slideable vertically between parallel guide plates 106 mounted on the base plate 32. This arrangement restricts the movement of the beam and prevents it moving endwise, that is to right or left viewed in FIG. 2, something that might otherwise occur with the flexure of the coupling blades 10 and 10' and main blade 12.

At its upper end the main blade 12 terminates in an integral top plate 107 which extends in a horizontal plane and is of rectangular shape. The vertical edge face of the plate are machined and slide between bearing pads 108 adjustably mounted on pillars 33. The ram 11, which extends vertically upwards from the top of the plate 107, is of H-shaped cross-section and has a horizontal closure plate at each of its upper ends. The ram thus has a vertically extensive niche in each side. The blade 25 and 25' are accommodated in those niches, their lower ends being anchored to closure plates at the lower end of the ram, that closure plate being anchored to the top plate 107 of the main blade. The upper ends of the blades 25 and 25' are anchored to the inner ends of the rockers 24 and 24' respectively, which project into upper parts of the niches in the ram. The pivot pin 26 is axially aligned with the pivot pins 22 and 22', while the pivot pin 26' is axially aligned with the pivot pins 23 and 23'. The counterweights 27 and 27' are constrained so as to be movable only vertically, in the same way as counterweights 20, 20', 21 and 21' are constrained.

An upper end portion of the ram is disposed in a central aperture in the top plate 34. The upper end of the ram 11 is secured to the central part of the flexible diaphragm 13 which permits vertical reciprocation of the ram but prevents horizontal movement thereof. Outer edge portions of the diaphragm are located in the top plate 34. As the ram, in use, reciprocates with a maximum stroke of 6 mm the movement can be accommodated by resilient distortion of the diaphragm even though the outer edge portions thereof are anchored to the top plate. The diaphragm may be a thin metal plate of circular outline. Alternatively it may be a thin metal plate of cross-shaped configuration in which case it may be formed from a circular disc from which four areas have been removed, each of which is approximately in the shape of a quadrant.

A work carrier 109 secured to the top of the ram 11 extends verticaly upwards through a central aperture in the welder plate 36, aligned with the central aperture in the top plate 34.

A backing member 110 is secured to one side of the work carrier 109. Flexible blades 111 extend one on each side of the backing member and are anchored at one end to the backing member and at the other end to a rigid support structure 112 mounted on the welder plate 36. The cylinder 113 of an hydraulic piston-cylinder unit 114 abuts the structure 112 between the blades 111. The piston rod 115 of the unit is connected to a carriage 116 of H-shaped configuration in plan. Parallel side arms 117 of the carriage carry longitudinally extending bearing plates 118 which are engaged by bearing pads 119 adjustably mounted in supporting structures 120 secured to the welder plate 36 one on each side of the carriage. A second work carrier (not shown) is incorporated in the carriage.

A lower part of the work carrier 109 is provided with a locator 121 which includes a pair of tapered, wedge-shaped heads that project from opposite sides of the carrier. Locating jaws 122 of complementary shape to those heads are mounted on the inner ends of rods 123 which are axially movable in bores in the welder plate 36. The outer end of each rod is attached to the piston rod of an hydraulic piston-and-cylinder unit 124 of which the cylinder is secured to the welder plate.

The apparatus operates in the following manner. Metal workpieces to be welded together are secured one to the work carrier 109 and the other to the work carrier incorporated in the carriage 116. The two workpieces have mutually abutting planar faces which are in a vertical plane normal to the axis of the piston-and-cylinder unit 114. The motor 37 is brought into operation (if not already operating) and the adjustment means 41 is adjusted to bring the eccentrics 3 and 3' into phase with each other. This causes the ram 11 and the first workpiece to reciprocate with a maximum stroke of 6 mm. The piston-and-cylinder unit 114 is operated to urge the second workpiece against the first workpiece. The reaction to the force applied to the reciprocating first workpiece by the second workpiece is transmitted to the backing member 110 and thence through tension in the flexible blades 111 to the support structure 112 against which the cylinder 113 abuts. In this way the reaction is not applied to the welder plate 36. Moreover the arrangement is preferably such that central parts of the mutually abutting faces of the workpieces are in the same horizontal plane as the mid-planes of the blades 111; this helps to prevent those abutting faces being forced from the vertical.

When sufficient frictional heat has been generated between the workpieces to enable the workpieces to be welded together, the adjustment means 41 is operated as rapidly as possible to bring the eccentrics 3 and 3' 180° out of phase with each other. This causes the amplitude of reciprocation of the ram and the first workpiece to be reduced to zero. Although the reciprocation of the ram has ceased, its vertical position relative to the base plate 32 is likely to be indeterminate. This partly is a consequence of effects of any remaining compression or tension of the components of the apparatus, and partly a consequence of any remaining frictional forces acting between the workpieces that are to be welded together. In order to locate the work carrier 109 accurately relative to the welder plate 36, the units 124 are operated. They cause the jaws 122 to engage the tapered heads of the locator 121 and to bring the locator, with the work carrier, to a predetermined level relative to the welder plate.

Continued force is exerted by the unit 114, urging the workpieces tightly into contact, so that they components become welded together. After welding is completed the unit 114 is operated to retract its piston rod 115 and withdraw the carriage 116 so that the welded workpieces can be removed. New components to be welded together can then be mounted in place and welding can be effected without the need to stop the motor 37.

The operation of the apparatus can be modified, if desired, by adjusting the adjustment means 41 in such a manner that during the frictional generation of heat the eccentrics 3 and 3' not 180° out of phase but are at some lesser angle out of phase. The consequences of this are that an increased force is transmitted to the ram, though the amplitude of reciprocation is reduced. Alternatively the apparatus may be modified so that the maximum extent to which the eccentrics are out of phase is less than 180°.

It is intended that the apparatus should primarily be operated when in the orientation described and illustrated that is with the axis of the main shaft 39 horizontal and the direction of reciprocation of the ram 11 vertical. The only disadvantage of this arrangement is that the apparatus is relatively tall (for example about 3.5 m) so that an operator handling the workpieces cannot stand on the same floor-level as the base 30. In an alternative orientation the apparatus is disposed with the axis of the main shaft still horizontal but with the direction of reciprocation of the ram also horizontal. The base 30 is anchored to the floor, while the top plate 34 and welder plate 36 are supported for horizontal sliding movement on supports that are also anchored to the floor.

Modifications of the apparatus are, of course, possible. For example, the reciprocable output element 5 may be anchored to one end of a flexible blade, or one end of an assembly of such blades, the other end of which is anchored to a fixed part of the apparatus, the bearing blocks 95 and associated parts then being omitted. In use the element is constrained by the blade or blades to reciprocate along a predetermined path which is substantially rectilinear. The element 5' may be mounted in a similar manner.

In another modification, the reciprocable output elements 5 and 5' are omitted entirely, and the followers 4 and 4' are linked directly to end parts of the beam 9 or other linking body by coupling means each comprising one or more flexible blades. If the apparatus illustrated were modified in this way, the beam 9 would have to be raised to the level of the elements 5 and 5' (now omitted) so that the whole apparatus would then be increased in height.

In the apparatus described, the first workpiece is secured to the work carrier 109 so as to reciprocate in unison with it. It may, however, sometimes be desirable to mount the first workpiece in such a manner that it is reciprocable along an arcuate or other non-rectilinear path and to couple the workpiece to the work carrier by means of some form of coupling, preferably comprising flexible component or components.

It is to be understood that each of the components of the apparatus that flexes when the apparatus is in use, such as the blades 7, 7', 10, 10', 12, 16, 16', 17, 17', 18, 18', 25, 25', 28 and 28', is made from steel. The ends of each such component are anchored to other components so that there is no relative movement at the point of anchorage. The anchorage may, at least in some cases be effected by integral formation so that the components are formed as a unitary whole. Alternatively the components may be formed separately and secured together. Particular care is usually necessary at these locations in order to ensure a satisfactory and robust anchorage. The main problem that tends to arise at such location is that of fretting corrosion. If there is any relative movement between the two components anchored together the repeated movement that occurs as the components are reciprocated in use can quickly lead to one or both of the components being damaged. It may suffice merely to bolt the components together, spring metal dowels preferably also being used to locate the components laterally. Another possible arrangement is illustrated in FIG. 8. This is a section through an end part of a flexible blade 125 with an enlarged end portion 126, and through an adjacent component 127 to which the blade is anchored. The blade 125 is provided with an integral extension 128 which projects beyond the enlarged end portion 126 and is aligned with the blade 125. The extension runs for the full width of the blade, as does the enlarged end portion. The extension 128 enters a groove formed in the component 127, which is wider than the blade. The enlarged end portion 126 seats firmly against the component on either side of the groove. Tapped holes are formed in the end of the extension 128 at uniform intervals along the extension. Cap screws such as the screw 129 extend through holes in the component that communicate with the bottom of the groove. The screws enter the tapped holes in the extension. When the screws are tightened up, the blade is firmly anchored to the component, and provided the components are accurately manufactured, without pay, fretting corrosion is avoided in use. It will be observed that sharp corners are avoided where the extension 128 meets the enlarged portion of the blade.

I claim:

1. Apparatus for use in friction welding comprising mechanism comprising driven means operative in use to cause reciprocation of a first workpiece relative to a second workpiece such as will lead to the generation of frictional heat between the workpieces, characterised in that the mechanism comprises a first drive operative to generate reciprocatory motion and a second drive operative to generate reciprocatory motion of the same frequency as that of the first drive, adjustment means operative to enable the relative phase of the first and second drives to be adjusted while said drives are in use, and integrating means operative to produce reciprocatory motion of said driven means which is a function of the reciprocatory motions of the first and second drives and of which the amplitude can be reduced to zero by appropriate adjustment of the adjustment means, the integrating means comprising a rockable linking body, first coupling means coupling the first drive to a first part of the linking body, and second coupling means coupling the second drive to a second part of the linking body, spaced from said first part, and said driven means being coupled to a third part of the linking body, spaced from said first and second parts thereof.

2. Apparatus according to claim 1 in which the first coupling means is flexible and is anchored at one end to the first part of the linking body, and the second coupling means is flexible and is anchored at one end to the second part of the linking body, whereby relative movement that occurs in use between the linking body and the coupling means is accommodated by flexure by the coupling means.

3. Apparatus according to claim 1 in which each of the first and second drive comprises a rotatable input member, a reciprocable output element, to which the associated part of the linking body is coupled by the associated coupling means, and conversion means operative to convert rotational movement of the input member into reciprocatory movement of the output element.

4. Apparatus according to claim 3 in which each of the first and second conversion means comprise an eccentric rotatable by the associated input member, a reciprocable follower driven in an orbital path by the eccentric and connecting means connected between the associated follower and the associated output element.

5. Apparatus according to claim 4 in which there is brake means operative to exert a torque resistant to relative rotation of the eccentrics during adjustment.

6. Apparatus according to claim 4 in which each of said connecting means is flexible and is anchored at one end of the associated follower and is anchored at the other end to the associated output element.

7. Apparatus according to claim 3 in which the adjustment means comprises a first helical gear coupled to the first rotatable input member and a second helical gear coupled to the second rotatable input member, the helical gears being co-axial and of opposite hands, and coupling means engaging the gears and movable axially, while rotating, to alter the relative angular relationship between the helical gears and consequently the relative angular relationship between the input members.

8. Apparatus according to claim 6 in which the first coupling means is flexible and is anchored at one end to the first part of the linking body, and the second coupling means is flexible and is anchored at one end to the second part of the linking body, whereby relative movement that occurs in use between the linking body and the coupling means is accommodated by flexure of the coupling means, and each coupling means and its associated connecting means are parallel to each other but are capable of flexure only in directions at right angles to each other, each coupling means and its associated connecting means projecting in the same direction from the associated reciprocable output element.

9. Apparatus according to claim 1 in which the driven means is coupled to the linking body by main flexing means anchored at one end to the driven means and anchored at the other end to the linking body, whereby relative angular movement that occurs in use between the driven means and the linking body, when the first and second drives are not in phase, is accommodated by flexure of the main flexing means.

10. Apparatus according to claim 9 in which the first coupling means is flexible and is anchored at one end to the first part of the linking body, and the second coupling means is flexible and is anchored at one end to the second part of the linking body, whereby relative movement that occurs in use between the linking body and the coupling means is accommodated by flexure of the coupling means, and in which the main flexing means, the first coupling means and the second coupling means comprise flexible blades that are mutually parallel, are of the same length and extend in the same direction from the linking body, the arrangement being such that in use, when the linking body rocks, those blades flex in unison and in the same manner, so that the resultant position of the driven means relative to the first and second drives is independent of the changes in effective length of the blades when they flex.

11. Apparatus according to claim 1 in which each reciprocatory component thereof is balanced by a counterweight which is constrained by rocking means to move in a direction opposite to that in which that component is moving.

12. Apparatus according to claim 1 which also includes mounting means for said second workpiece and pressure means operative to press said second workpiece against the reciprocating first workpiece, said mechanism being mounted on a fixed support and the pressure means being mounted independently on said fixed support.

* * * * *